United States Patent
Floury et al.

(10) Patent No.: US 11,706,478 B2
(45) Date of Patent: Jul. 18, 2023

(54) DEVICE AND METHOD FOR GENERATING AND RENDERING ENRICHED MULTIMEDIA CONTENT

(71) Applicant: Orange, Issy-les-Moulineaux (FR)

(72) Inventors: Cédric Floury, Chatillon (FR); Aurore Catteau, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 16/914,202

(22) Filed: Jun. 26, 2020

(65) Prior Publication Data

US 2021/0014556 A1    Jan. 14, 2021

(30) Foreign Application Priority Data

Jun. 27, 2019  (FR) ...................................... 1907010

(51) Int. Cl.
*H04N 21/431*     (2011.01)
*H04N 21/44*      (2011.01)
*H04N 21/4402*    (2011.01)

(52) U.S. Cl.
CPC ....... *H04N 21/431* (2013.01); *H04N 21/4402* (2013.01)

(58) Field of Classification Search
CPC .......................... H04N 21/431; H04N 21/4402
USPC ........................................................ 725/143
See application file for complete search history.

(56) References Cited

U.S. PATENT DOCUMENTS

| | | | |
|---|---|---|---|
| 2006/0059514 A1 | 3/2006 | Hsiao et al. | |
| 2011/0157475 A1* | 6/2011 | Wright | H04N 21/4402 348/700 |
| 2014/0067828 A1* | 3/2014 | Archibong | G06F 17/30277 707/748 |

(Continued)

FOREIGN PATENT DOCUMENTS

| | | |
|---|---|---|
| JP | 2007-135158 | 5/2007 |
| WO | WO 2014/208268 | 12/2014 |

OTHER PUBLICATIONS

Geoffrey Morrison, Cnet, Widescreen, letterbox and black bars: How to wrangle TV aspect ratios, https://www.cnet.com/news/widescreen-letterbox-and-black-bars-how-to-wrangle-tv-aspect-ratios/ printed Mar. 3, 2020 in 7 pages.

(Continued)

*Primary Examiner* — Dominic D Saltarelli
(74) *Attorney, Agent, or Firm* — Knobbe, Martens, Olson & Bear, LLP (57) ABSTRACT

A method of enrichment of at least one source multimedia content for rendering on a device is disclosed. A rendering zone has a width/height ratio different from the width/height ratio of the source multimedia content. In one aspect, the method comprises identifying, from the source multimedia content, of at least one enrichment content intended to be rendered in a region of the rendering zone distinct from a region for rendering the source multimedia content. And these enriching the source multimedia content, taking into account of the at least one identified enrichment content and delivering at least one enriched multimedia content comprising at least one piece of enrichment data representative of a rendering of the enrichment content in a region of the rendering zone distinct from a region for rendering the source multimedia content.

20 Claims, 5 Drawing Sheets

(56) References Cited

U.S. PATENT DOCUMENTS

2015/0319505 A1\* 11/2015 Patadia .............. H04N 21/8586
 725/34
2016/0191971 A1\* 6/2016 Benitez .............. H04N 21/8456
 725/34
2020/0120383 A1\* 4/2020 Edwards ............ H04N 21/4402

OTHER PUBLICATIONS

Preliminary Search Report for FR1907010 dated Mar. 19, 2020, and corresponding to the French priority application.

\* cited by examiner

DEVICE AND METHOD FOR GENERATING AND RENDERING ENRICHED MULTIMEDIA CONTENT

CROSS-REFERENCE TO RELATED APPLICATIONS

This application claims the benefit of foreign priority to French Patent Application No. 1907010, filed Jun. 27, 2019, the contents of which is incorporated by reference herein in its entirety.

TECHNOLOGICAL FILED

The field of the disclosed technology is that of content enrichment. More specifically, the disclosed technology pertains to a method of enriching contents to render them in a rendering zone having a width/height ratio different from that of the content to be rendered.

DESCRIPTION OF RELATED TECHNOLOGY

Exchanges of personal data (such a photos, videos, messages etc.) through terminals such as smartphones or tablets are greatly increasing at the present time. To this end, there is a multitude of messaging applications (SMS, «WhatsApp», «Facebook Messenger» etc. . . . ) through which textual or multimedia content (photos/videos) can be sent to one of more intended recipients.

Figure 1:
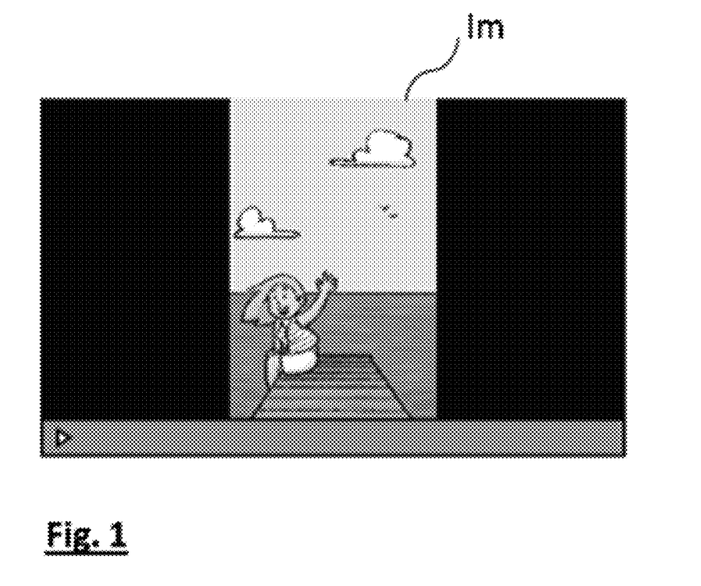
FIG. 1 presents an example of display in landscape mode of a multimedia content captured in portrait mode, according to a prior-art disclosed technology.

One frequently encountered problem with photos/videos is related to the difference in format, and more particularly to the width/height ratio between the multimedia content and the rendering zone (for example the screen of the recipient's terminal). This is the case, for example, when the snapshot (photo or video) is taken in landscape mode and when the rendering screen is oriented in portrait mode or vice versa. If we consider for example the portrait mode, once it is sought to view a video or a photo in landscape mode, the disclosed technologys display black bars to fill up the display on either side of the source multimedia content referenced Im, as illustrated in FIG. 1.

One drawback of this disclosed technology for displaying black bars to "fill up" the rendering screen when the content to be rendered does not have the same format as the rendering zone, lies in the fact that the rendering zone is not totally exploited, giving rise to an impaired or even negative user experience.

In addition, the black bars, which can represent a relatively large zone of the screen compared with the multimedia content itself, can therefore be perceived as an annoyance for the user relative to the multimedia content that he is viewing.

A disclosed technology is therefore needed for rendering source multimedia content, in a rendering zone that does not have the same width/height ratio as the content, that is more ergonomical and offers a better user experience for viewing multimedia content while at the same time having identical or increased efficiency in terms of storage, transmission and processing of multimedia content as compared with existing solutions.

SUMMARY OF CERTAIN INVENTIVE ASPECTS

The disclosed technology responds to this need by proposing a method of enrichment of at least one source multimedia content for its rendering, on a rendering device, in a rendering zone having a width/height ratio different from the width/height ratio of the source multimedia content. In the field of telecommunications, a solution to the problem of a difference in format of captured videos (e.g., portrait mode) versus rendered videos (e.g., landscape mode) causing the rendering to occur between black bars is described. The disclosure specifies a method of enrichment of at least one source multimedia content for its rendering, on a rendering device (e.g., smartphone 2), in a rendering zone having a width/height ratio different from the width/height ratio of the captured source multimedia content on a capturing device (e.g., smartphone 1). The enrichment content could be relevant content extracted from the source content or content chosen from a database as being representative of the captured content. The enrichment data can be transmitted as metadata in addition to the source content According to the disclosed technology, the method of enrichment comprises the following steps:
- a step of identification, from the source multimedia content, of at least one enrichment content intended to be rendered in a region of the rendering zone distinct from a region for rendering the source multimedia content;
- a step of enrichment of the source multimedia content taking account of the at least one identified enrichment content and delivering at least one enriched multimedia content comprising at least one piece of enrichment data representative of a rendering of the enrichment content in a region of the rendering zone distinct from a region for rendering the source multimedia content.

Thus, the disclosed technology relies on a wholly novel and inventive approach to the rendering of a content in a rendering zone with a width/height ratio different from that of the content (for example a rendering in landscape mode of a multimedia content having been captured in portrait mode, or vice versa) by enrichment of the original multimedia content so as to provide its optimal rendering in terms of user experience.

Indeed, in the most classic case of a source content captured in portrait mode and rendered on a screen oriented in landscape mode, the source content does not occupy the totality of the rendering zone of the screen and the known rendering disclosed technologys respond to this set of problems by displaying black bars on either side of the source multimedia content. The user experience is then not optimal because the fact of not enjoying the benefit of the entire rendering zone can cause some amount of frustration.

The disclosed technology therefore enables a rendering constituted, on the one hand, by a source multimedia content and, on the other hand, by an enrichment content identified from the source content itself when the source content has a width/height ratio different from that of the rendering zone. Thus, in the case of a content captured in portrait mode, the disclosed technology makes it possible to obtain a consistent and harmonious or undisturbed rendering in landscape mode, for example by replacing the black bars of the prior art with content relative to the source content, with a soft focus for example.

For example, the enrichment content corresponds to an image or a part of an image of the captured content (video or photo content for example), considered as relevant because it is representative of the captured content (for example with recurrent personalities, or a dominant color).

The enrichment content can also correspond to a content not extracted from the captured content but chosen from a data base (a library of images or videos for example) as being representative of the captured content (a screen background type image representing a landscape resembling landscapes that frequently appear in the captured content).

According to the disclosed technology, the enrichment content can be identified, for example, at the time of storage of the captured content (directly on the capture device, or on another storage device/server) or else at the time of the rendering (on a rendering device).

The term "multimedia content" is understood to mean any type of digital multimedia content, such as video or audio-visual contents, such as for example videos or films.

According to one particular aspect, the method of enrichment further comprises a step of processing of the at least one identified enrichment content, delivering the at least one piece of enrichment data, and the step of enrichment of the source multimedia content comprises a sub-step of insertion of the at least piece of enrichment data in the source multimedia content to deliver the at least one enriched multimedia content.

Thus, according to one particular aspect, the enrichment content identified from the source multimedia content is processed so as to obtain at least one piece of enrichment data intended to be added to the multimedia content to provide an enriched multimedia content.

Such enrichment data correspond for example to one or more metadata added to the source multimedia content, thus enabling the transmission of the pieces of information on additional enrichment content without directly transmitting this additional enrichment content. These metadata are then read/decoded at the time of the rendering so that it is possible to display/render the additional content at the same time as the captured content. This makes it possible not to increase the size or the weight of the transmitted content (hence the bandwidth necessary for its transmission in a network, or again the size of the memory zone necessary for the storage) while at the same time offering the optimum rendering to the user.

For example, these enrichment data correspond to an image number in a video, coordinates of a zone in an image, a processing operation (for example a degree of blurring, a change of color etc.) to be applied to the enrichment content, etc.

According to one particular characteristic, the step of identification of at least one enrichment content comprises a step of analysis of the source multimedia content according to at least one predetermined criterion.

Thus, the source content is analyzed, according to predetermined criteria, in order to enable identification of the enrichment content. For example, the predetermined criteria correspond to the search for recurrent personalities, dominant and recurrent colors, uniform zones, either to use the images having these personalities or this dominant color as an additional content, or to select a relevant additional content from a library of contents.

In this way, the rendering of the source content and of the enrichment content is harmonious and enables a better user experience because the enrichment is related to the source content.

For example, the at least one identified enrichment content corresponds to a portion of the source multimedia content.

Thus, according to one particular aspect, the enrichment content, intended to be rendered in addition to the source content in the rendering zones not used for the source content, corresponds to an extracted portion of the source content, for example a zone of an image identified by spatial coordinates in addition to the number of the image, or an entire image in the case of a video content identified by an image number (one or more personalities, a color, a background etc.).

The link between the enrichment content and the source content is direct in this case, because the enrichment content is extracted from the source content. The user can then benefit from a consistent rendering throughout the rendering zone.

According to one particular aspect, the step of identification of at least one enrichment content comprises a step of selection of at least one enrichment content distinct from the source multimedia content.

Thus the enrichment content, intended to be rendered in addition to the source content in the rendering zones not used for the source content, corresponds to a content distinct from the source content and selected for example from a database or a library of videos, images, animations or again texts. The selection of this enrichment content however takes account of the source content, for example on the basis of one or more dominant colors in the source content to choose an image having the same colors or on the basis of a background (snow, the sea, the beach, forest, a prairie) to choose an image representative of a type of place, ambiance or again a personalized or contextualized text.

In this case, the link between the enrichment content and the source content is also present, for the enrichment content is selected according to criteria pertaining to the source content. The user can therefore also benefit from a consistent rendering on the entire rendering zone.

According to one particular feature, the step of identification of at least one enrichment content comprises a sub-step of oculometry of a user during a rendering of the source multimedia content.

Thus, the identification of the enrichment content to be rendered in the areas not occupied by the source content is done during rendering and implemented in taking account of a disclosed technology of tracking the user's gaze known as "eye tracking". In this way, the zones of the image or of the video forming the source content on which the user's gaze lingers are identified as being capable of serving as enrichment content to be rendered beside the source content.

In this case, the enrichment content is updated in real time, during the rendering, hence by the rendering device, and enables a consistent and progressive rendering throughout the rendering zone, further improving the user experience. The frequency of updating of the enrichment content can be predetermined in taking account of criteria pertaining both to the implementing of the oculometry technology and to ergonomy for the user. It can especially be assumed that an excessively frequent updating of the enrichment content impairs the user experience instead of improving it.

According to one particular feature, the at least one piece of enrichment data comprises at least one spatial coordinate representative of the enrichment content.

Thus, in this case, the enrichment data comprises at least one spatial coordinate enabling the retrieval of the enrichment content, such as for example a coordinate of the center of the enrichment content, given that other characteristics such as the size of the content, the width/height ratio of rendering, are predetermined for example. Limiting the piece of enrichment data to a single coordinate makes it possible to locate, for example in the source content, the center of the identified enrichment content while at the same time adapting its format to that of the rendering zone for example.

According to one particular aspect, the method of enrichment comprises, prior to the step of identification, a step of detection in the source multimedia of at least one piece of data representing the width/height ratio of the source multimedia content.

Thus, according to this particular aspect, the disclosed technology detects the format in which the source content has been captured, especially in order to set the parameters for size and or the width/height ratio of the enrichment content to obtain an optimal rendering in addition to the source content.

According to one particular feature, the step of enrichment comprises a step of addition of at least one indicator of presence of the at least one piece of enrichment data, the indicator being intended to signal the availability of enrichment content during a rendering of the source multimedia content, on a rendering device, in a rendering zone of the rendering device having a width/height ratio similar to the width/height ratio of the source multimedia content.

The disclosed technology also relates to a method for rendering at least one enriched multimedia content in a rendering zone of a rendering device, the at least enriched multimedia content comprising at least one source multimedia content and at least one piece of enrichment data representative of a rendering of an enrichment content in a region of the rendering zone distinct from a region for rendering the source multimedia content.

According to the disclosed technology, the method for rendering comprises the following steps:
- a step of detection of a difference between a width/height ratio of the rendering zone and a width/height ratio of the source multimedia content;
- if a difference is detected:
  - a step of processing the at least one piece of enrichment data, delivering the enrichment content;
  - a step of rendering the source multimedia content and the enrichment content respectively in two distinct regions of the rendering zone.

Thus, the disclosed technology makes it possible to render an enriched multimedia content optimally by detecting a difference in width/height ratio between the rendering zone and the content, and by exploiting enrichment data present in the enriched content. The exploitation of these enrichment data delivers the enrichment content identified during the method of enrichment and intended to be rendered beside the source content.

According to one particular aspect, if no difference is detected, then the method for rendering comprises the following steps:
- a step of detection of the at least one piece of enrichment data;
- a step of rendering an indicator of presence of enrichment content.

Thus, according to one particular aspect, the presence of an enrichment content with a view to a rendering in a zone with a width/height ratio different from that of the source content is reported to the user when the source content is first of all rendered in a zone with an adapted width/height ratio. For example, when a photo or a video is captured in portrait mode and rendered in portrait mode, a visual indicator is displayed, in addition to the photo or the video, so that the user knows that if he orients his rendering device in landscape mode, he will obtain the benefit of a content additional to the source content to give him a better experience. If the user changes the orientation of his rendering device, the source content is then rendered with the enrichment content in the complementary zones on the screen.

The disclosed technology also pertains to an enrichment device comprising at least one processing unit configured to enrich at least one source multimedia content for its rendering, on a rendering device in a rendering zone having a width/height ratio different from the width/height ratio of the source multimedia content, the processing unit being also configured to:
- identify, from the source multimedia content, at least one un enrichment content intended to be rendered in a region of the rendering zone distinct from a region for rendering the source multimedia content;
- enrich the source multimedia content in taking account of the at least one identified enrichment content, and deliver at least one enriched multimedia content comprising at least one piece of enrichment data representative of a rendering of the enrichment content in a region of the rendering zone distinct from a region for rendering the source multimedia content.

In particular, the enrichment device is capable of implementing the steps of the method of enrichment as described here above. For example, such an enrichment device corresponds to a mobile communications terminal capable of capturing and/or storing and/or rendering a multimedia content such as a smartphone, a tablet, a computer, etc., or a multimedia content storage server.

The disclosed technology also relates to a computer program product comprising program code instructions for the implementing of a method as described here above or the execution of the functions of a device as described here above when it is executed by a processor.

The corresponding enrichment device and computer program mentioned here above present at least the same advantages as those conferred by the method of enrichment according to the disclosed technology.

The disclosed technology is also aimed at providing a rendering device comprising at least one processing unit configured to render at least one enriched multimedia content in a rendering zone of a rendering device, the at least one enriched multimedia content comprising at least one source multimedia content and at least one piece of enrichment data representative of a rendering of an enrichment content in a region of the rendering zone distinct from a region for rendering the source multimedia content, and the processing unit being also configured to:
- detect a difference between a width/height ratio of the rendering zone and a width/height ratio of the source multimedia content;
- if a difference is detected:
  - process the at least one piece of enrichment data and deliver the enrichment content;
  - render the source multimedia content and the enrichment content respectively in two distinct regions of the rendering zone.

In particular, the rendering device is capable of implementing the steps of the method for rendering as described here above. For example, such an enrichment device corresponds to a mobile communications terminal capable of rendering a multimedia content, such as a smartphone, a tablet, a computer etc.

The disclosed technology also relates to a computer program product comprising program code instructions for the implementing of a method or the execution of the functions of a device as described here above when it is executed by a processor.

The corresponding enrichment device and computer program mentioned here above have at least the same advantages as those conferred by the method for rendering according to the disclosed technology.

The disclosed technology is also aimed at providing a computer-readable recording medium or carrier on which there is recorded a computer program comprising program code instructions or the execution of the steps of the method of enrichment according to the disclosed technology as described here above.

The disclosed technology is also aimed at providing a computer-readable recording medium on which there is recorded a computer program comprising program code instructions for the execution of the steps of the method for rendering according to the disclosed technology as described here above.

Such a recording medium or carrier can be any entity or device whatsoever capable of storing the program. For example, the medium can comprise a storage means such as a ROM, for example a CD ROM or a microelectronic circuit ROM or again a magnetic recording means, for example a USB stick or a hard disk drive.

Besides, such a recording medium can be a transmissible carrier such as an electrical or optical signal that can be conveyed via an electrical or optical cable, by radio or by other means such that the computer program that it contains is executable at a distance. The program according to the disclosed technology can especially be uploaded to a network, for example the Internet network.

As an alternative, the recording medium can be an integrated circuit into which the program is incorporated, the circuit being adapted to executing or to being used in the execution of the method of enrichment and/or the method for rendering mentioned above.

BRIEF DESCRIPTION OF THE DRAWINGS

Other features and advantages of the disclosed technology shall appear more clearly from the following description, given by way of a simple illustratory and non-exhaustive example, with reference to the figures, of which

DETAILED DESCRIPTION OF CERTAIN ILLUSTRATIVE EMBODIMENTS

The general principle of the disclosed technology relies on the identification, from a source multimedia content, of an enrichment content to be rendered in addition to/besides the source multimedia content when the rendering zone (for example a communications terminal screen) has a width/height ratio different from that of the source multimedia content.

In addition, the identified enrichment content, which corresponds for example to an extract from the source multimedia content, is not added directly to this source multimedia content to obtain an enriched content, so as not to increase the size/weight (in bytes) of the enriched content (for its storage or its transmission), but is processed in order to obtain one piece of enrichment data which, for its part, will be added to the source multimedia content to obtain an enriched multimedia content.

According to another aspect, the disclosed technology therefore relates to the rendering of such an enriched content, by detection, reading and processing of the enrichment data in order to retrieve the enrichment content to be rendered in addition/besides the source multimedia content, when a difference is detected between a width/height ratio of the rendering zone and a width/height ratio of the source multimedia content.

According to a secondary aspect, the disclosed technology also provides for the display of an indicator of presence of the enriched content (for example in the form of an icon) when, on the contrary, there is no difference detected between a width/height ratio of the rendering zone and a width/height ratio of the source multimedia content. In this way, at the time of the rendering, the user knows that his experience would be improved as compared with the prior-art disclosed technologys if he changes the orientation of the rendering zone and that this zone will then no longer have the same width/height ratio as that of the source multimedia content.

Figure 2:
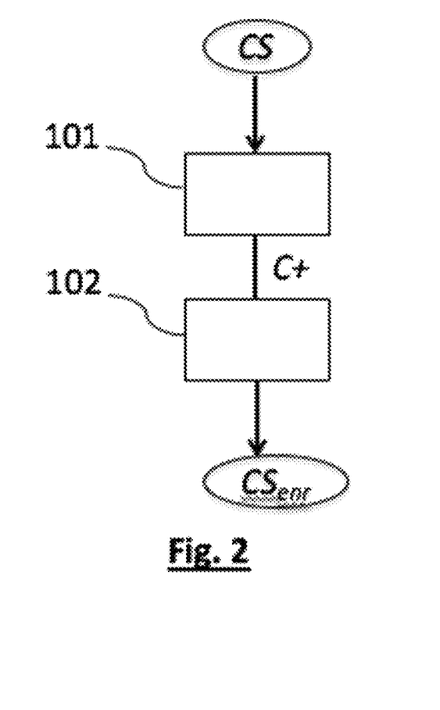
FIG. 2 illustrates, in flowchart form, the different steps of the method of enrichment a source multimedia content according to one embodiment of the disclosed technology.

Referring now to FIG. 2, a more detailed view is presented of the steps of enrichment of a source multimedia content CS for its rendering, on a rendering device, in a rendering zone having a width/height ratio different from that of the source multimedia content. For example, this case arises when a video, or a photo, is taken in a portrait format, and when the rendering device is oriented in the landscape format. As already discussed with reference to FIG. 1 of the prior art, this is expressed by the addition of black bars on either side of the video or the photo, thus impairing the user experience.

According to one embodiment of the disclosed technology, the method of content enrichment thus comprises a first step of identification 101 of at least one enrichment content intended to be rendered in a region of the rendering zone that is distinct from a region for rendering the source multimedia content CS, for example as a replacement of the black bars of the prior art. According to the disclosed technology, the identification 101 of at least one enrichment content C+ is implemented from the source multimedia content CS, thus making it possible to obtain an enrichment content C+ that is related to/or matches the source multimedia content CS, making the overall rendering consistent and harmonious for the user.

In the examples described here below, the enrichment content therefore constitutes a background of the source content with a rendering that is soft-focused and contrasted relative to the source content. The visual impression which makes for a better user experience can be explained by the fact that the enrichment content is rendered on either side of the source content in its source format (i.e. its snapshot format), the entire rendering zone being occupied by a content other than a black background with, in the foreground, the source content.

A different implementation, not described in detail and not illustrated, could consist of the rendering of the enrichment content on either side of the source content, or else the rendering of two distinct enrichment contents on either side of the source content, the idea being, as already explained, to replace the black bars by a content presenting the meaning/link relative to the source content.

Figure 5A:
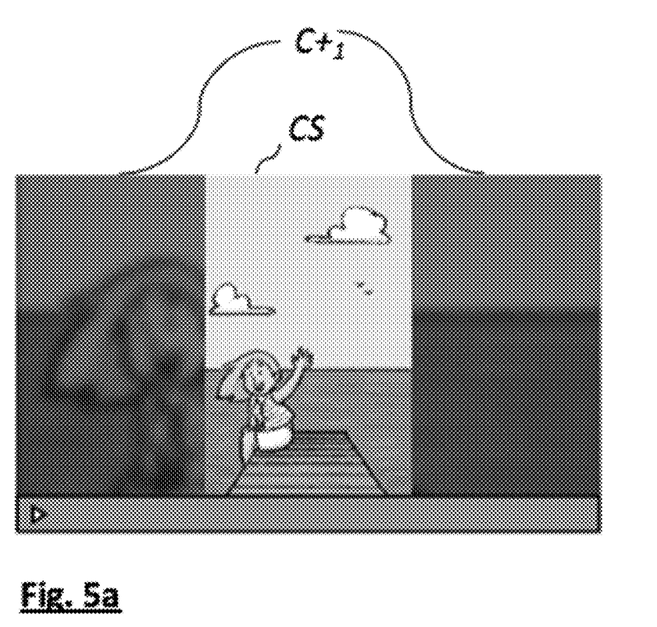
FIG. 5a illustrates an example of rendering of an enriched content according to a first variant of the disclosed technology.

For example, the enrichment content $C+_1$, according to a first variant of implementation, corresponds to a portion or an extract of the source multimedia content CS, considered as being representative of the source multimedia content CS. To this end, at least one of the following criteria is applied in order to identify the enrichment content $C+_1$: the presence of recurrent personalities, one or more dominant or recurrent colors, one or more dominant or recurrent backgrounds or landscapes. This first variant is illustrated for example in FIG. 5a, illustrating the rendering of a source multimedia content CS and, on each side, a portion of this source multimedia content CS representing more particularly the central personality of the source content. Besides, a filter has been applied to the identified portion to make it blurred. This first variant is described in greater detail here below, with reference to the second step of the method of enrichment. According to this first variant, if the source content corresponds to a photo taken in a forest landscape with a predominance of green, then the enrichment content may correspond to a portion of the image representing trees.

Figure 5B:
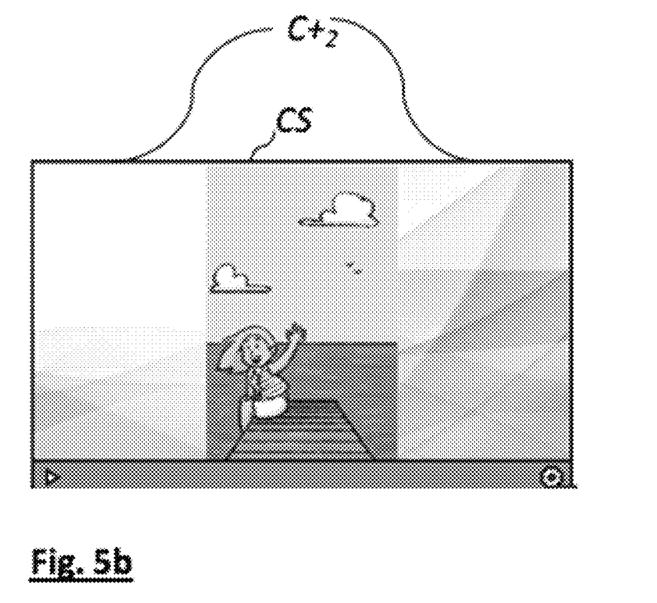
FIG. 5b illustrates an example of rendering of an enriched content according to a second variant of the disclosed technology.

According to a second variant of implementation, the enrichment content $C+_2$ corresponds to a multimedia content imported from a database, or a library of images, videos, animations or again texts considered here too as representative of the source multimedia content CS. To this end, the at least one of the following criteria of similitude is applied in order to identify the enrichment content $C+_2$: dominant or recurrent color or colors of the content to be selected in the database similar to one of the colors of the source content, dominant or recurrent background or landscape similar to a background or landscape of the source content. This second variant is illustrated for example in FIG. 5b illustrating the rendering of a source multimedia content CS and, on each side, a background presenting geometrical shapes in tones close to those of the upper part of the source content (i.e. a background of blue tones similar to those of the sky).

Figure 5C:
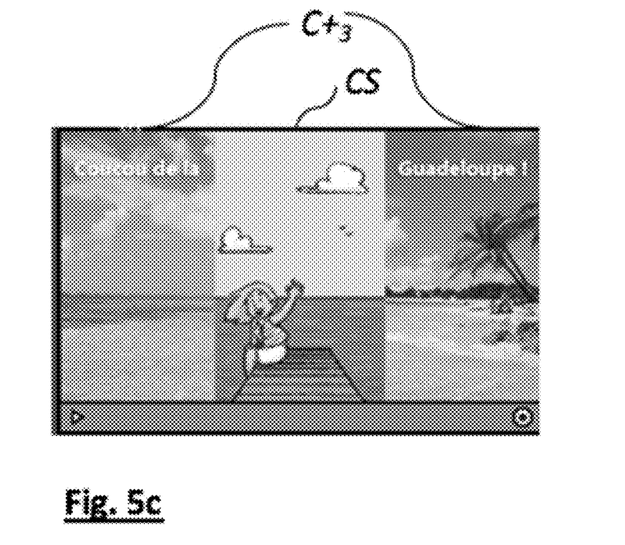
FIG. 5c illustrates an example of rendering of an enriched content according to a third variant of the disclosed technology.

According to a third variant illustrated in FIG. 5c, the enrichment content $C+_3$ corresponds to a background having a beach landscape (consistent with the source content representing a little girl on a pontoon moving forward in the sea, with a blue sky in the background), as well as a customized message. Such a contextualized or personalized enrichment content $C+_3$ can require an action by the user at the time of the capture of the source content, so as to define for example the text to be added to the enrichment content.

The method of content enrichment then comprises a step of enrichment 102 of the source multimedia content CS, taking account of the preliminarily identified enrichment content and delivering at least one enrichment content $CS_{enr}$. According to the disclosed technology, the enriched multimedia content $CS_{enr}$ comprises at least one piece of enrichment data D+ representative of a rendering of the enrichment content C+ in a region of the rendering zone that is distinct from a region for rendering a source multimedia content CS.

Thus, in taking account of the preliminarily identified enrichment content, an enriched content is obtained, comprising especially the source content and at least one piece of enrichment data, for example in the form of metadata, that enables the retrieval of the enrichment content for its rendering without having to add it as such to the source content. In this way, the enriched content does not have a size (in bytes) that is very different from the source content, thus optimizing the resources for its storage and/or for its transmission.

For example, the enrichment data is derived from a processing of the enrichment content in order to extract one or more pieces of information therefrom that make it possible to render it, such as for example:

- an image number in a source video, as well as one or more spatial coordinates enabling the identification of a portion in this image;
- one or more spatial coordinates enabling the identification of a portion in a source image;
- an identifier (URL or pointer) of an image/video/animation/text in a database or library;
- one or more identifiers of parameters to be applied, at the time of the rendering, to the enrichment content, such as for example a level of blur to obtain a contrasted effect of the enrichment content relative to the source content.

Besides, according to one particular feature of the disclosed technology, the piece or pieces of enrichment data correspond to metadata transmitted at the same time as the source content in an enriched content $CS_{enr}$. These metadata are then read, at the time of the rendering of the enriched content, so as to be able to render the source content and the enrichment content if the format of the rendering zone is different from that of the source content.

If we consider the first alternative embodiment described here above, in which the enrichment content corresponds to a portion of the source content (video), the enrichment data must enable the rendering of this portion of the source content, and therefore comprise for example:

- one or more image numbers depending on whether it is chosen to extract the enrichment content several times during the rendering (i.e. the enrichment content changes as and when the source content is rendered, in order to adapt thereto and therefore to offer a consistent and smooth rendering throughout the rendering) or extract if only from an identified reference image;
- one or more spatial coordinates, obtained for example according to the process described here below with reference to FIG. 3;
- a piece of information for setting the parameters of a conversion to be applied to the enrichment content, such as for example a degree of blurred rendering.

Figure 3:
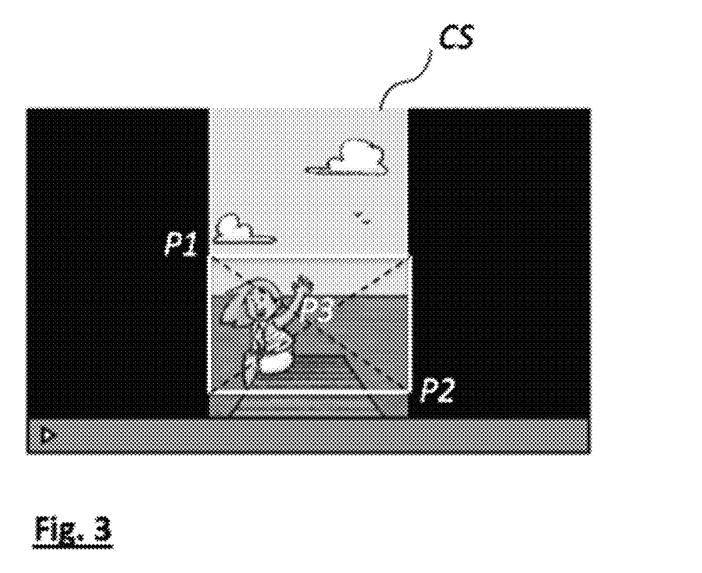
FIG. 3 illustrates an example of identification of an enrichment content according to one embodiment of the disclosed technology.

FIG. 3 therefore illustrates the result of a process for obtaining/computing spatial coordinates used to identify the enrichment content to be rendered. First of all, the source content CS (image or video) is analyzed, for example by reading metadata already present (see here below) in this source content, so as to find out especially the snapshot format, for example portrait or landscape. The knowledge of this format makes it possible especially to set the parameters of the size of the content portion that will form the enrichment content. Then, an analysis of all the images of the source video is implemented, for example via an artificial intelligence algorithm, to identify a representative portion (in this case around the child), in taking account of criteria already described here above (recurrent personalities, dominant color or colors, etc.). On the basis of this representative portion, the coordinates of P1 and P2 are computed and then the spatial reference coordinate P3 is computed from P1 and P2. It is this coordinate that will advantageously be stored in the metadata of the enriched content. Indeed, the advantage of storing a single coordinate P3 and not the coordinates P1 and P2 lies especially in the adaptation of the format of the enrichment content at the time of the rendering. Thus, during the reading of the video on a rendering device, the knowledge of the coordinate P3 enables the re-computation of P1 and P2 as a function of the resolution/format of the rendering device which plays the video. These steps therefore make it possible to determine a rectangle in the images according to the landscape width/height ratio, if for example the video has been recorded in the portrait format, the goal of the disclosed technology being to adapt the rendering of a source content when the rendering zone has a ratio different from that of the source content. As illustrated in FIG. 3, the identified rectangle has a landscape format while the source content has been taken in the portrait format, because the rectangle corresponding to the enrichment content is intended to be rendered in the background of the source content only when a user wishes to view the source content in landscape mode.

Once the spatial coordinates P1, P2 and P3 have been obtained, the coordinate P3 is inserted, in metadata form, into the source content to deliver an enriched content.

Several known text formats have been exploited to describe metadata, such as for example XML (Extensible Markup Language), or again XMP (Extensible Metadata Platform) or again JSON (JavaScript Object Notation). A novel format can also be defined to describe the enrichment data intended for insertion into the source content to obtain an enriched content.

For example, if we refer to XMP, there is an "Orientation" field which corresponds to a field of characters that can have a value "Horizontal" or "Vertical" making it possible to know the snapshot format (portrait or landscape).

According to the disclosed technology, several fields could be added such as those described in the table below:

TABLE 1

| Field name (or "Tag") | Possible values | Description |
|---|---|---|
| EnrichVideoMode | YES/NO | Field for reporting that the enriched content is available |
| AutoFrame | YES/NO | Field indicating that all the images of the source content are to be exploited (YES) or only one image is to be exploited (NO) |
| MonoFrame | Image reference | Field enabling knowledge of the reference image if the "AutoFrame" field is at NO |
| EnrichFrameCenter | X, Y coordinate of P3 | Point P3 computed by the method of enrichment |
| EnrichFrameOperation | Blur | Example of setting parameters of blurred rendering |

These fields, transmitted in the enriched content in addition to the source content, make it possible at the time of the rendering to display the identified enrichment content when the format of the rendering zone is different from that of the source content.

As already indicated here above, it is possible to transmit, via the metadata, only one spatial coordinate P3 enabling the computation of the other coordinates P1 and P2 to retrieve the enrichment content to be rendered.

According to the embodiment described here above and its variants, the method of enrichment of a source multimedia content can be implemented equally well by a camera device (for example a smartphone, a tablet, etc.) as by a content storage device (for example a contents server) or again by a rendering device (for example a smartphone, a tablet, a computer, etc.).

According to a second embodiment in which the method of enrichment of a multimedia source content is implemented by the rendering device itself, an oculometry disclosed technology is used to identify the enrichment content. Thus, the enrichment content is updated regularly, as and when the enriched content is rendered as a function of the results of the tracking of the user's eye movements. To this end, predetermined criteria can be applied to the source content such as for example:

a minimum duration for the fixing of a part of the screen by the user in order to identify a portion of the source content representative of an interest of the user;
   a frequency of updating of the enrichment content, in order to preserve a consistent and smooth user experience, in not changing the enrichment content too frequently, so as not to disturb the user, while at the same time adapting the enrichment content to the development of the source content while it is being rendered. For example, if the source video shows landscapes and then personalities, the enrichment content could in a first stage be representative of the landscapes (a color or a background) and in a second stage it could be representative of one or more recurrent personalities.

According to this second embodiment, the piece or pieces of enrichment data D+ correspond for example to a spatial coordinate representative of the center of a zone of interest of the user located in the source content by means of a disclosed technology of oculometry/tracking the user's gaze.

Referring now to FIGS. 4, 5a to 5c and 6, a description is provided of a method for rendering an enriched multimedia content according to one embodiment of the disclosed technology.

Figure 4:
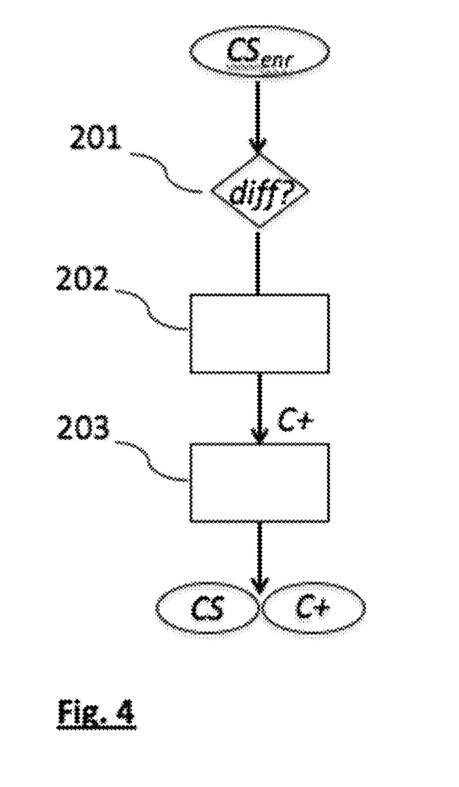
FIG. 4 illustrates, in flowchart form, the different steps of the method for rendering an enriched multimedia content according to one embodiment of the disclosed technology.

The main steps of this method for rendering are illustrated in FIG. 4 and are implemented by a rendering device. Besides, the enriched multimedia content $CS_{enr}$ according to any one of the embodiments of the method of enrichment described here above comprise at least one source multimedia content CS and at least one piece of enrichment data $D_+$ representative of a rendering of an enrichment content C+ in a region of the rendering zone (of the rendering device) distinct from a region for rendering the source multimedia content CS.

In a first stage, a step of detection 201 of a difference between a width/height ratio of the rendering zone and a width/height ratio of the source multimedia content CS is implemented, so as to determine whether the enrichment content must be rendered in addition to the source content.

Thus, if a difference is detected, a step for processing 202 the piece of enrichment data $D_+$ is implemented, for example to read the metadata of the enriched content and thus deliver the enrichment content C+ identified by the method of enrichment. This processing step 202 therefore enables the rebuilding/retrieval of the enrichment content C+ and the obtaining of associated parameters if any, such as for example a blurred rendering to be applied. As already discussed here above, the enrichment data $D_+$ can for example correspond to an image number in a video and a spatial coordinate enabling the rebuilding of a rectangle in the format of the rendering zone (for example the landscape format) as well as a degree of blurred rendering.

A step of rendering 203 of the source multimedia content CS and of the enrichment content C+ respectively in two distinct regions of the rendering zone is then implemented. For example, the enrichment content is rendered on each side of the source content, rendered in its portrait format, at the center of the rendering zone.

Examples of rendering of an enriched content are illustrated especially in FIGS. 5a to 5c, according to the three variants described here above for the method of enrichment, in which respectively:

the enrichment content $C+_1$ corresponds to a portion of the source content;

the enrichment content $C+_2$ corresponds to a geometrical background chosen from a library of images;

the enrichment content $C+_1$ corresponds to an image chosen from a library of images and a contextual text (chosen or not chosen by the original user from the source content).

According to one particular feature, the method for rendering, if no difference of width/height ratio is detected between the rendering zone and the source content CS, i.e. when the source content is rendered in its snapshot format (in portrait mode for example), the disclosed technology provides for the display of an indicator of presence of an enrichment content, addressed to the user viewing the source content. In this way, this user can, if he prefers, change the orientation of his rendering device without being afraid that the rendering might deteriorate.

Figure 6:
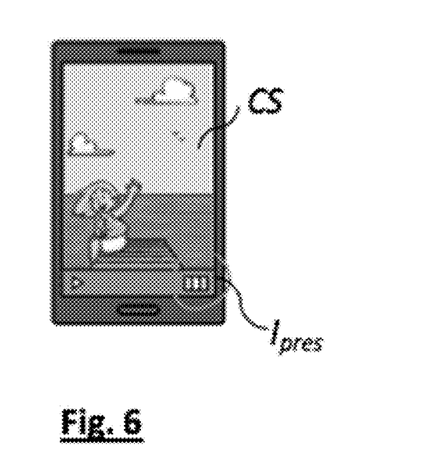
FIG. 6 illustrates an example of rendering of an enriched content according to another embodiment of the disclosed technology.

To this end, the enrichment data D+ present in the enriched content $CS_{enr}$ is detected, during a step of detection, so as to make sure that an enrichment content C+ is truly available. Then, an indicator of presence $I_{pres}$ of enrichment content is displayed in addition to the source content CS on the screen of the rendering device as illustrated in FIG. 6.

For example, one of fields of metadata described in the table above ("EnrichVideoMode"), corresponding to a piece of enrichment data can be detected in order to make sure of the presence of an enrichment content C+.

The indicator of presence $I_{pres}$ of enrichment content can also be displayed provided only one piece of enrichment data (any one) is present in the enriched content.

The different embodiments and variants described here above therefore make it possible to provide a consistent and smooth display of a source content when it is rendered in a rendering zone (of a rendering device) having a width/height ratio different from that of the source content itself. This can be the case for example when a photo or a video is captured in portrait mode and rendered in landscape mode, and vice versa and in any other specific rendering format different from the exposure format.

Figure 7:
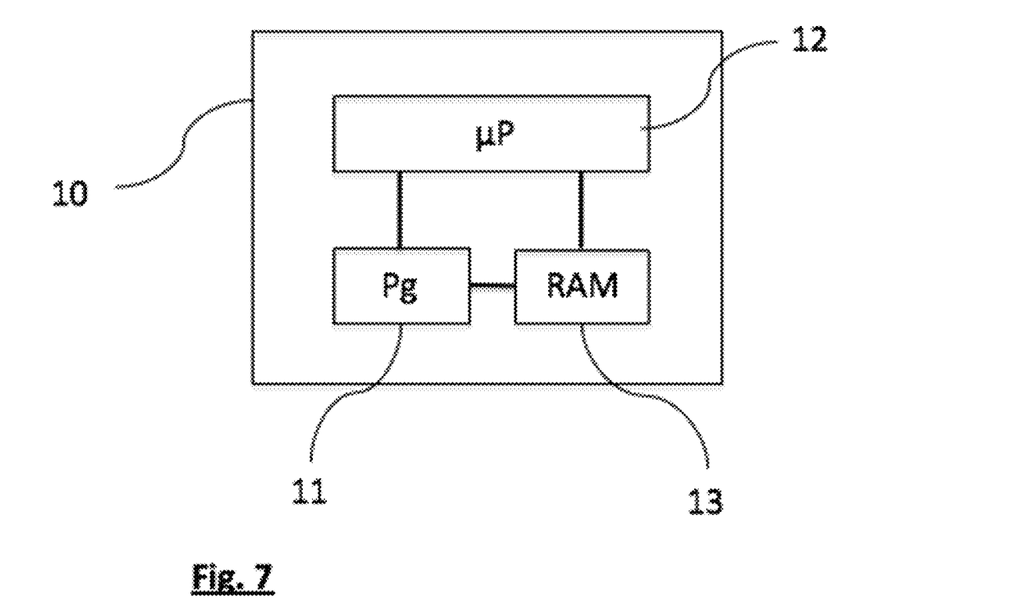
FIG. 7 presents the hardware structure of a device for enriching a source multimedia content according to one embodiment of the disclosed technology.

Referring now to FIG. 7, we present the hardware structure of an enrichment device 10 according to one embodiment of the disclosed technology.

The term "enrichment device" can correspond equally well to a software component as to a hardware component or a set of hardware and software components, a software component itself corresponding to one or more computer programs or sub-programs or more generally to any element of a program capable of implementing a function or a set of functions.

More generally, such an enrichment device comprises a live memory 13 (for example a random-access memory or RAM), a processing unit 12 equipped for example with a processor and driven by a computer program 11. At initialization, the code instructions of the computer program are for example loaded into the live memory 13 and then executed by the processor of the processing unit 12. The live memory 13 contains especially the criteria of identification of enrichment content, the rules for computing at least one spatial coordinate representative of the enrichment content, etc. The processor of the processing unit 12 implements the steps of the method of enrichment according to the instructions of the computer program 11 in order to:

identify, from the source multimedia content, at least one enrichment content intended to be rendered in a region of the rendering zone distinct from a region for rendering the source multimedia content;

enrich the source multimedia content in taking account of the at least one enrichment content, and deliver at least one enriched multimedia content comprising at least one piece of enrichment data representative of a rendering of the enrichment content in a region of the rendering zone distinct from a region for rendering the source multimedia content.

FIG. 7 illustrates only one particular way, among several possible ways, of obtaining the enrichment device so that it will perform the steps of the method described in detail here above with reference to FIG. 1 to FIG. 6 (in any one of the different embodiments or in a combination of these embodiments). Indeed, these steps can be obtained equally well on a reprogrammable computation machine (a PC computer, a DSP processor or a microcontroller) executing a program comprising a sequence of instructions or on a dedicated computing machine (for example a set of logic gates such as an FPGA or an ASIC or any other hardware module).

Should the enrichment device be obtained with a reprogrammable computing machine, the corresponding program (i.e. the sequence of instructions) could be stored in a storage medium that is detachable (such as for example a floppy disk, a CD ROM or a DVD ROM) or non-detachable, this storage medium being partially or totally readable by a computer or a processor.

Figure 8:
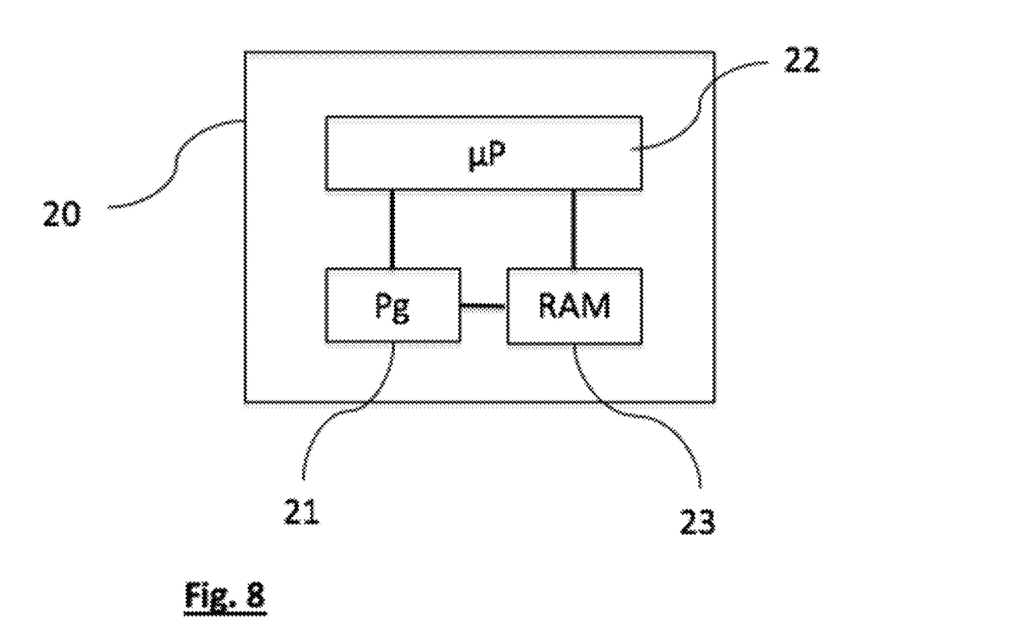
FIG. 8 presents the hardware structure of a disclosed technology for rendering an enriched multimedia content according to one embodiment of the disclosed technology.

Finally, referring to FIG. 8, we present the hardware structure of a rendering device 210 according to one embodiment of the disclosed technology.

The term "rendering device" can correspond equally well to a software component as to a hardware component or a set of hardware and software components, a software component itself corresponding to one or more computer programs or sub-programs or more generally to any element of a program capable of implementing a function or a set of functions.

More generally, such a rendering device comprises a live memory 23 (for example a random-access memory or RAM), a processing unit 22 equipped for example with a processor and driven by a computer program 21. At initialization, the code instructions of the computer program are for example loaded into the live memory 23 and then executed by the processor of the processing unit 22. The processor of the processing unit 22 implements the steps of the method for rendering according to the instructions of the computer program 21 in order to:

detect a difference between a width/height ratio of the rendering zone and a width/height ratio of the source multimedia content;

if a difference is detected:

process the at least one piece of enrichment data and deliver the enrichment content;

render the source multimedia content and the enrichment content respectively in two distinct regions of the rendering zone.

FIG. 8 illustrates only one particular way among several possible ways of obtaining the rendering device so that it will perform the steps of the method described in detail here above with reference to FIGS. 1 to 6 (in any one of the different embodiments or in a combination of these embodiments). Indeed, these steps can be obtained equally well on a reprogrammable computation machine (a PC computer, a DSP processor or a microcontroller) executing a program comprising a sequence of instructions or on a dedicated computing machine (for example a set of logic gates such as an FPGA, an ASIC or any other hardware module).

Should the rendering device be obtained with a reprogrammable computing machine, the corresponding program (i.e. the sequence of instructions) could be stored in a storage medium that is detachable (such as for example a floppy disk, a CD ROM or a DVD ROM) or non-detachable, this storage medium being partially or totally readable by a computer or a processor.

What is claimed is:

1. A method of enrichment of at least one source multimedia content for rendering, on a rendering device, in a rendering zone having a width/height ratio different from a width/height ratio of the source multimedia content, the method comprising:
    identifying, from the source multimedia content, of at least one enrichment content intended to be rendered in a region of the rendering zone distinct from a region for rendering the source multimedia content, and
    obtaining at least one enriched multimedia content comprising the source multimedia content and at least one piece of enrichment data, in the form of metadata, comprising at least one rendering parameter to be applied when rendering the identified enrichment content in a region of the rendering zone distinct from a region for rendering the source multimedia content.

2. The method according to claim 1, further comprising:
    processing of the at least one identified enrichment content,
    delivering the at least one piece of enrichment data, and
    obtaining the enriched multimedia content comprises enriching the source multimedia content by inserting at least piece of enrichment data in the source multimedia content to deliver the at least one enriched multimedia content.

3. The method according to claim 2, the identifying at least one enrichment content comprises analyzing the source multimedia content according to at least one predetermined criterion.

4. The method according to claim 3, wherein the at least one identified enrichment content corresponds to a portion of the source multimedia content.

5. The method according to claim 4, wherein the identifying at least one enrichment content comprises performing oculometry of a user during a rendering of the source multimedia content.

6. The method according to claim 2, further comprising, prior to the identifying at least one enrichment content, detecting the source multimedia of at least one piece of data representing the width/height ratio of the source multimedia content.

7. The method according to claim 6, further comprising:
    in response to detection of the difference, processing the at least one piece of enrichment data, delivering the enrichment content, and rendering the source multimedia content and the enrichment content respectively in two distinct regions of the rendering zone.

8. The method according to claim 6, further comprising:
    in response to detection of no difference, detecting the at least one piece of enrichment data, and rendering of an indicator of presence of enrichment content.

9. The method according to claim 1, wherein the identifying at least one enrichment content comprises analyzing the source multimedia content according to at least one predetermined criterion.

10. The method according to claim 1, wherein the at least one identified enrichment content corresponds to a portion of the source multimedia content.

11. The method according to claim 1, wherein the identifying at least one enrichment content comprises selecting at least one enrichment content distinct from the source multimedia content.

12. The method according to claim 1, wherein the identifying at least one enrichment content comprises performing oculometry of a user during a rendering of the source multimedia content.

13. The method according to claim 1, wherein the at least one piece of enrichment data comprises at least one spatial coordinate representative of the enrichment content.

14. The method according to claim 1, further comprising, prior to the identifying at least one enrichment content, detecting the source multimedia of at least one piece of data representing the width/height ratio of the source multimedia content.

15. A method for rendering at least one enriched multimedia content in a rendering zone of a rendering device, wherein
    the at least enriched multimedia content comprises at least one source multimedia content and at least one piece of enrichment data, in the form of metadata, comprising at least one rendering parameter to be applied when rendering the identified enrichment content in a region of the rendering zone distinct from a region for rendering the source multimedia content, and
    the method comprises:
        detecting a difference between a width/height ratio of the rendering zone and a width/height ratio of the source multimedia content, and
        in response to detection of the difference:
            processing the at least one piece of enrichment data,
            delivering the enrichment content, and
            rendering the source multimedia content and the enrichment content respectively in two distinct regions of the rendering zone.

16. The method according to claim 15,
    wherein, in response to detection of no difference, detecting the at least one piece of enrichment data, and rendering of an indicator of presence of enrichment content.

17. An enrichment device comprising at least one processor configured to enrich at least one source multimedia content for rendering, on a rendering device in a rendering zone having a width/height ratio different from a width/height ratio of the source multimedia content, wherein the at least one processor is configured to:
    identify, from the source multimedia content, at least one enrichment content intended to be rendered in a region of the rendering zone distinct from a region for rendering the source multimedia content, and
    obtain at least one enriched multimedia content comprising the at least one source multimedia content and at least one piece of enrichment data, in the form of metadata, comprising at least one rendering parameter to be applied when rendering the identified enrichment content in a region of the rendering zone distinct from a region for rendering the source multimedia content.

18. A rendering device comprising at least one processor configured to render at least one enriched multimedia content in a rendering zone of a rendering device, wherein the at least one enriched multimedia content comprises at least one source multimedia content and at least one piece of enrichment data, in the form of metadata, comprising at least one rendering parameter to be applied when rendering the identified enrichment content in a region of the rendering zone distinct from a region for rendering the source multimedia content, and the at least one processor being configured to:

detect a difference between a width/height ratio of the rendering zone and a width/height ratio of the source multimedia content;

in response to detection of the difference:
process the at least one piece of enrichment data,
deliver the enrichment content, and
render the source multimedia content and the enrichment content respectively in two distinct regions of the rendering zone.

19. A storage medium comprising program code instructions that, when executed by a processor, cause the processor to implement the method according to claim 1.

20. A storage medium comprising program code instructions that, when executed by a processor, cause the processor to implement the method according to claim 15.

* * * * *